United States Patent
Yoon et al.

(10) Patent No.: US 9,115,797 B2
(45) Date of Patent: Aug. 25, 2015

(54) METHOD OF SETTING REFERENCE POSITION OF ACTUATOR IN AUTOMATED MANUAL TRANSMISSION

(71) Applicant: Hyundai Motor Company, Seoul (KR)

(72) Inventors: Young Min Yoon, Seoul (KR); Hyung Wook Cho, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 6 days.

(21) Appl. No.: 13/838,058

(22) Filed: Mar. 15, 2013

(65) Prior Publication Data

US 2014/0157933 A1 Jun. 12, 2014

(30) Foreign Application Priority Data

Dec. 12, 2012 (KR) ........................ 10-2012-0144950

(51) Int. Cl.
*G06F 7/00* (2006.01)
*F16H 59/02* (2006.01)
*F16H 61/28* (2006.01)

(52) U.S. Cl.
CPC ............ *F16H 59/0204* (2013.01); *F16H 61/28* (2013.01); *F16H 2061/283* (2013.01); *F16H 2342/02* (2013.01)

(58) Field of Classification Search
CPC .............................. F16H 59/02; F16H 59/0204
See application file for complete search history.

(56) References Cited

U.S. PATENT DOCUMENTS

| | | | |
|---|---|---|---|
| 7,093,511 B2 * | 8/2006 | Norum et al. | 74/335 |
| 7,438,666 B2 * | 10/2008 | Kupper et al. | 477/115 |
| 7,882,757 B2 * | 2/2011 | Kretz-Busch et al. | 74/337.5 |
| 8,666,615 B1 * | 3/2014 | Kim et al. | 701/51 |
| 2006/0005654 A1 * | 1/2006 | Ehrlich et al. | 74/473.1 |
| 2014/0102236 A1 * | 4/2014 | Yoon | 74/473.1 |
| 2014/0107899 A1 * | 4/2014 | Yoon et al. | 701/51 |

FOREIGN PATENT DOCUMENTS

| | | |
|---|---|---|
| JP | 58-180327 A | 10/1983 |
| KR | 10-2010-0050710 A | 5/2010 |
| KR | 10-2011-0011250 A | 2/2011 |
| KR | 10-2011-0092075 A | 8/2011 |
| KR | 10-2011-0123372 A | 11/2011 |
| KR | 10-2012-0038797 A | 4/2012 |
| WO | WO 98/54491 A1 | 12/1998 |

\* cited by examiner

*Primary Examiner* — David D Le
(74) *Attorney, Agent, or Firm* — Morgan, Lewis & Bockius LLP

(57) ABSTRACT

A method of setting a reference position of an actuator in an automated manual transmission, may include acquiring a full stroke by checking both ends in a shifting direction, determining whether or not the full stroke is within a normal range, moving a finger to a position that is half of a previous full stroke when the full stroke acquired at the procedure of acquiring the full stroke exceeds the normal range as a result of determining whether or not the full stroke is within the normal range, and determining whether or not a selection operation is carried out at the position that is half of the full stroke after moving the finger to the position that is half of the previous full stroke.

5 Claims, 5 Drawing Sheets

METHOD OF SETTING REFERENCE POSITION OF ACTUATOR IN AUTOMATED MANUAL TRANSMISSION

CROSS-REFERENCE TO RELATED APPLICATION

The present application claims priority to Korean Patent Application No. 10-2012-0144950, filed on Dec. 12, 2012, the entire contents of which is incorporated herein for all purposes by this reference.

BACKGROUND OF THE INVENTION

1. Field of the Invention

The present invention relates to a method of setting a reference position of an actuator in an automated manual transmission, and more particularly, to a method of setting a reference position for the control of an actuator in an automated manual transmission, in which a speed change is carried out by a selection operation of selecting a shift rail, to which a target transmission gear is allocated, and a shifting operation of completing the speed change to the target transmission gear by displacing the selected shift rail, and the selection operation and the shifting operation are carried out using the actuator.

2. Description of Related Art

FIG. 1 shows a transmission mechanism of an automated manual transmission of the related art to which the present invention can be applied, specifically, a double clutch transmission.

Referring to FIG. 1, the transmission mechanism includes two fingers F which move up and down on the paper surface to carry out a selection operation and pivots to carry out a shifting operation, an odd stage selection actuator 9 and an even stage selection actuator 13 which respectively move the two fingers F up and down, and an odd stage shifting actuator 11 and an even stage shifting actuator 15 which respectively pivot the two fingers F. A speed change operation is carried out as desired in response to the two fingers F carrying out the selection operation by moving up and down and carrying out the shifting operation by moving to the right and left, as shown in FIG. 2.

The odd stage selection actuator 9 and the even stage selection actuator 13 are implemented as a solenoid actuator, and the odd stage shifting actuator 11 and the even stage shifting actuator 15 are implemented as a motor. The motor is characterized in that it requires additional position sensors in order to locate the position of the fingers F following its operation. However, the position sensors increase the price of a product and are disadvantageous considering the configuration and weight of a package. An approach that enables a controller to correctly locate the fingers F with no position sensors is required.

In the related art, the following method is used in order to locate the fingers. During startup of a vehicle, the fingers are set to specific reference positions. When the fingers are confirmed to be located at the specific reference positions, the subsequent rotation of the motor is calculated based on the reference positions in order to track and locate the position of the fingers.

For reference, the reference positions of the two fingers F are marked in FIG. 2. Since it is not guaranteed that the fingers F are located at the reference positions as shown during startup of the vehicle, an initialization operation of moving the fingers F to the reference positions must be carried out.

FIG. 3 shows a method of setting a reference position of a finger, i.e. an actuator, of the related art. During ignition of a vehicle, a finger F is moved in the shifting direction following the sequence of numbers shown in FIG. 3. Afterwards, the full stroke of the finger F is checked. When the full stroke satisfies a preset value, the finger F is moved to a position where selection is enabled. Here, selection is enabled when the finger is moved to a middle position. In sequence, the finger F is reciprocated in the selecting direction, so that a correct reference position of the finger F can be determined and set.

However, in the initialization process as described above, when baulking occurs, i.e. the full stroke that has been calculated by reciprocating the finger F in the shifting direction is less than the preset value, the above-described initialization cannot be completed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of setting a reference position for the control of an actuator in an automated manual transmission, in which initialization can be completed as properly as possible even when baulking occurs, i.e. a full stroke that has been calculated by reciprocating a finger in the shifting direction is less than a preset value, so that the reliability and stability of operation of the transmission can be increased, thereby improving the merchantability of a vehicle.

In an aspect of the present invention, a method of setting a reference position of an actuator in an automated manual transmission, may include acquiring a full stroke by checking both ends in a shifting direction, determining whether or not the full stroke is within a normal range, moving a finger to a position that is half of a previous full stroke when the full stroke acquired at the procedure of acquiring the full stroke exceeds the normal range as a result of determining whether or not the full stroke is within the normal range, and determining whether or not a selection operation is carried out at the position that is half of the full stroke after moving the finger to the position that is half of the previous full stroke.

When the selection operation may have succeeded as a result of determining whether or not the selection operation is carried out, it is determined that a process of setting the reference position of the actuator may have succeeded.

When the selection operation may have failed as the result of determining whether or not the selection operation is carried out, moving the finger to an opposite end position in the both ends, moving the finger to the position that is half of the previous full stroke after moving the finger to the opposite end position may have been carried out, and determining whether or not the selection operation may have been carried out at the position that is half of the previous full stroke after moving the finger to the position that is half of the previous full stroke may have been carried out.

When the selection operation may have succeeded as the result of determining whether or not the selection operation may have been carried out, it is determined that the process of setting the reference position of the actuator may have succeeded.

When the selection operation may have failed as the result of determining whether or not the selection operation may have been carried out, it is determined that the process of setting the reference position of the actuator may have failed.

According to embodiments of the present invention as set forth above, initialization can be completed as properly as possible even when baulking occurs, i.e. a full stroke that has been calculated by reciprocating a finger in the shifting direction is less than a preset value, so that the reliability and stability of operation of the transmission can be increased, thereby improving the merchantability of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
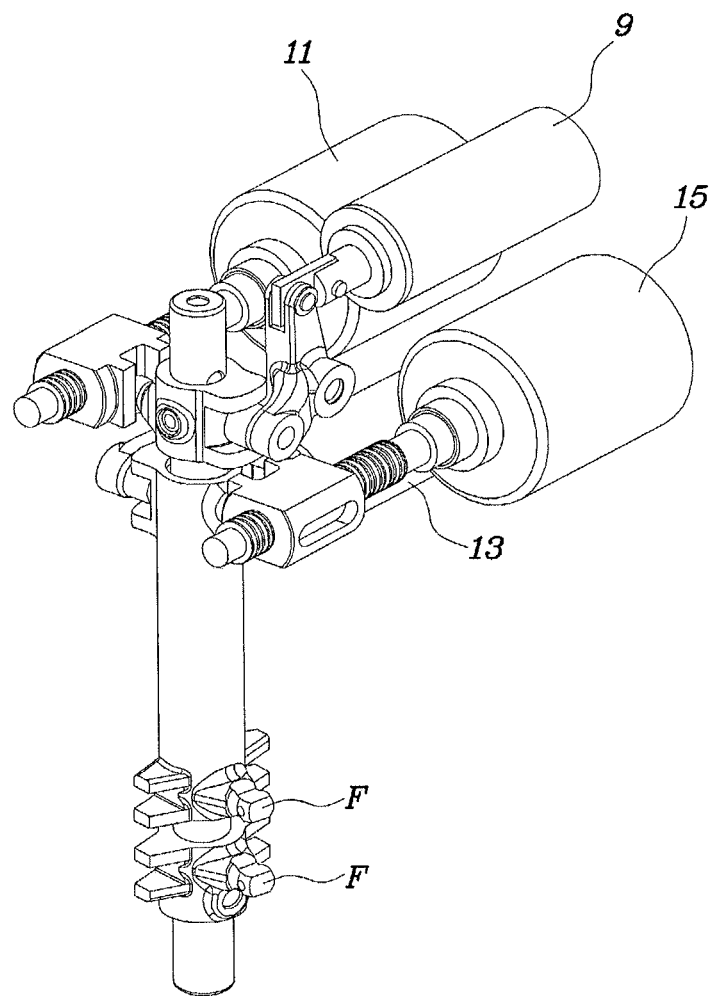
FIG. 1 shows a transmission mechanism of an automated manual transmission of the related art.
Figure 2:
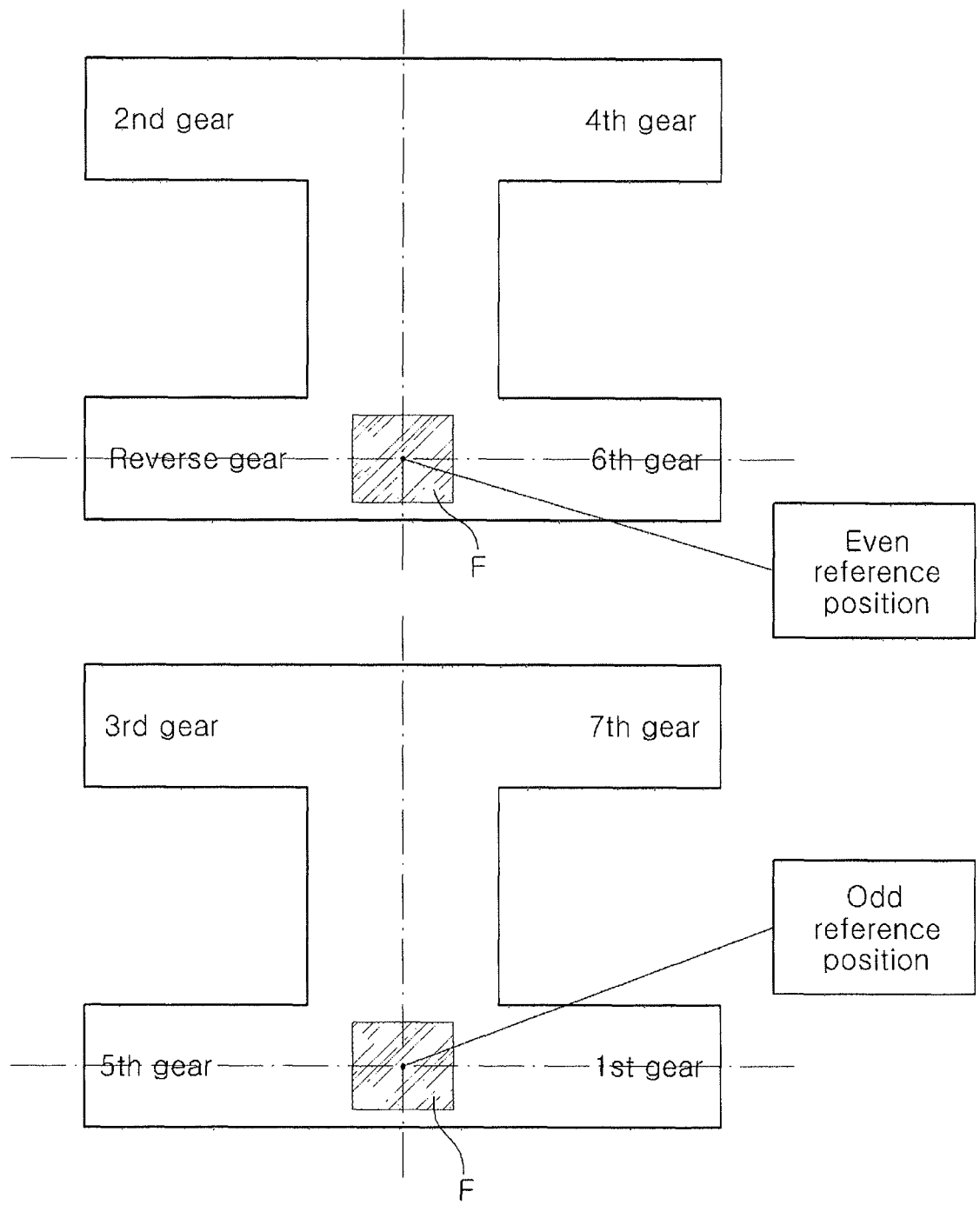
FIG. 2 is a view showing a shift gage pattern and reference positions of fingers according to the transmission mechanism shown in FIG. 1.
Figure 3:
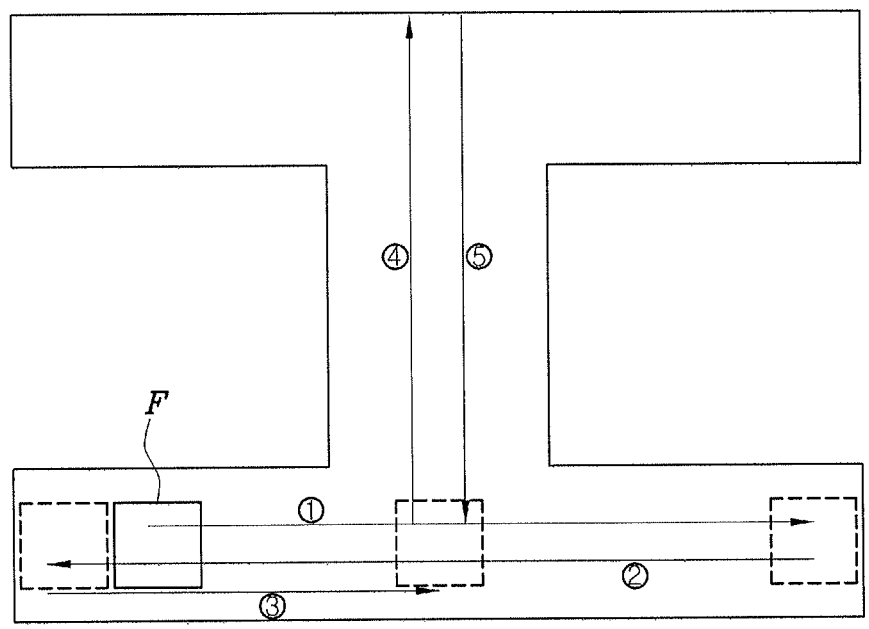
FIG. 3 is a view showing a method of setting a reference position of an actuator of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 4:
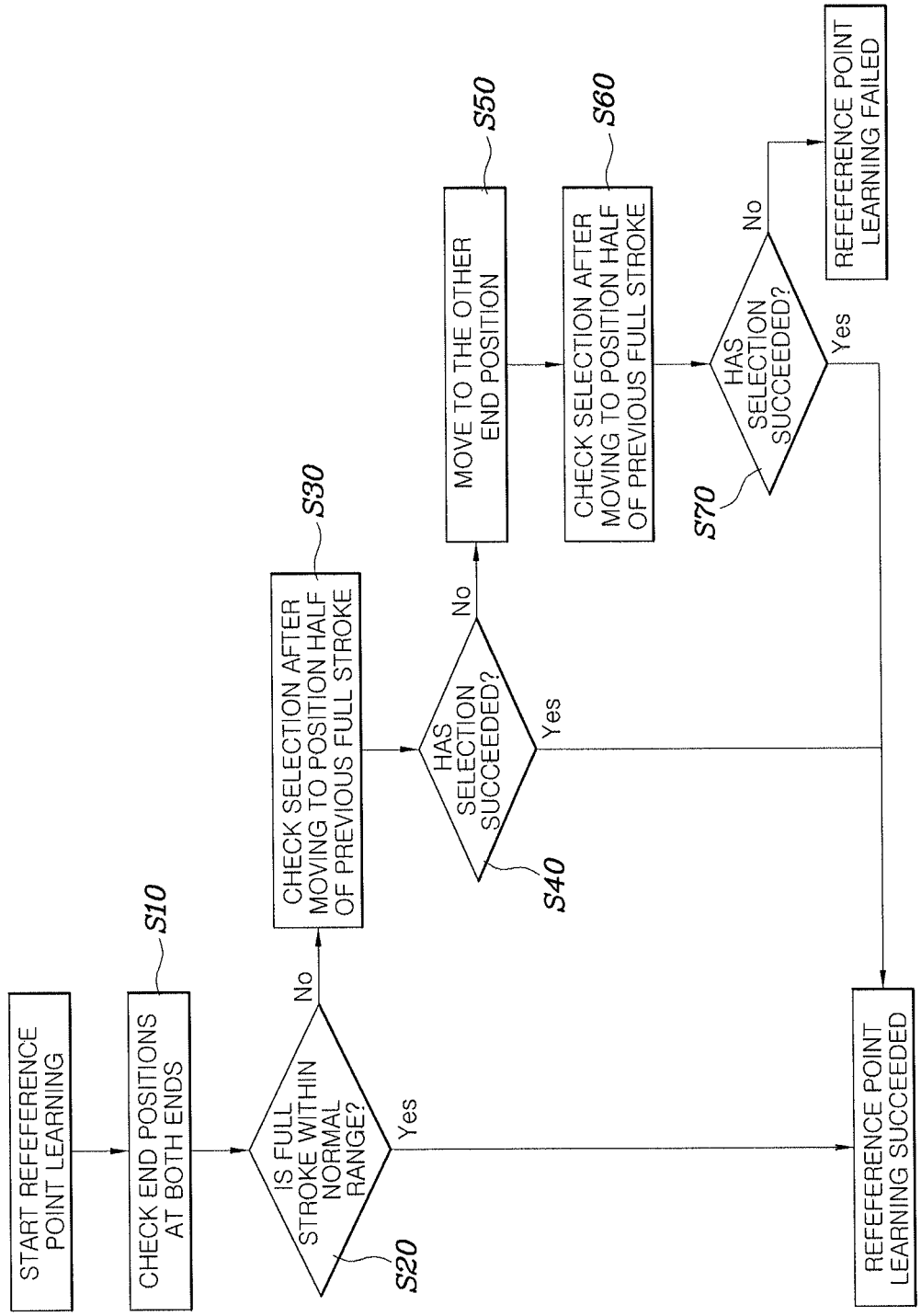
FIG. 4 is a flowchart showing an exemplary embodiment of a method of setting a reference position of an actuator in an automated manual transmission according to an exemplary embodiment of the present invention.
Figure 5:
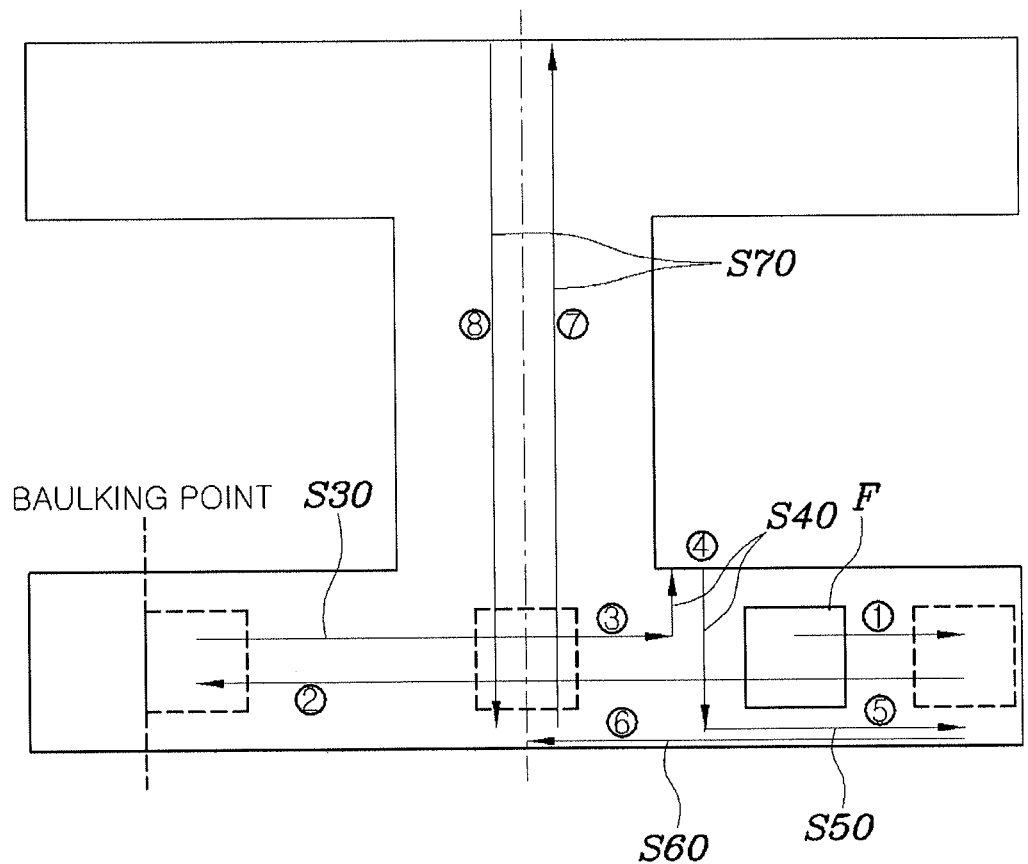
FIG. 5 is a view showing the method of setting a reference position of an actuator in an automated manual transmission according to an exemplary embodiment of the present invention.

Referring to FIG. 4 and FIG. 5, an exemplary embodiment of a method of setting a reference position of an actuator in an automated manual transmission according to an exemplary embodiment of the present invention includes a full stroke acquisition step S10 of acquiring a full stroke by checking both ends in the shifting direction, a stroke check step S20 of determining whether or not the full stroke is within a normal range, a first-half movement step S30 of moving a finger to a position that is half of a previous full stroke when the full stroke acquired at the full stroke acquisition step S10 exceeds the normal range as a result of the stroke check step S20, and a first selection check step S40 of determining whether or not a selection operation is carried out at the position that is half of the previous full stroke after the first-half movement step S30 has been carried out.

Specifically, as in the related art, the full stroke is acquired by moving the finger to the both ends in the shifting direction. When the acquired full stroke is within the preset normal range, the selection operation is carried out by moving to a position half of the full stroke. When the selection operation succeeds, the process of setting the reference position of the actuator is completed normally. However, when it is determined that the acquired full stroke is beyond the preset normal range at the stroke check step S20, the present full stroke is not used. Instead, the finger is moved from one end to the position that is half of the full stroke that has been successfully used before the present process, and then the first selection check step S40 is carried out. Consequently, the initialization process is attempted even when the full stroke is abnormal.

When the selection operation has succeeded as a result of the first selection check step S40, it is determined that the process of setting the reference position of the actuator has succeeded.

This indicates that the full stroke that has been used and the resultant present neutral position can effectively guarantee the following selection. Therefore, the following control can be carried out as normally as possible by considering this to be a normal initialization process, thereby increasing the reliability of operation and a consumer's confidence in the vehicle.

When the selection operation has failed as a result of the first selection check step S40, the initialization process is attempted again by carrying out an end movement step S50 of moving the finger to the opposite end position, a second-half movement step S60 of moving the finger to a position that is half of the previous full stroke after the end movement step S50 has been carried out, and a second selection check step S70 of determining whether or not the selection operation has been carried out at the position that is half of the previous full stroke after the second-half movement step S60 has been carried out.

When the selection operation has succeeded as a result of the second selection check step S70, it is determined that the process of setting the reference position of the actuator has succeeded.

Of course, when the selection operation has failed as a result of the second selection check step S70, it is determined that the process of setting the reference position of the actuator has failed.

In an example, referring to FIG. 5, the finger has not moved to the full stroke due to baulking. The first-half movement step S30 and the first selection check step S40 are carried out at that state, but the selection operation has failed. Thus, the selection operation is carried out normally by executing the end movement step S50, the second-half movement step S60 and the second selection check step S70, thereby completing the initialization position.

According to the present invention as set forth above, even when the full stroke has exceeded from the normal range due to any reasons during the initialization process, it is possible to determine whether or not selection can be made using one end of both ends, between which the finger can move, and the half of the previous full stroke, so that the initialization of the reference position of the actuator can be successfully completed, thereby contributing to improvement in the reliability of operation of a transmission of a vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of setting a reference position of an actuator in an automated manual transmission, the method comprising:
   acquiring a full stroke by checking both ends in a shifting direction;
   determining whether or not the full stroke is within a normal range;
   moving a finger to a position that is half of a previous full stroke when the full stroke acquired at the procedure of acquiring the full stroke exceeds the normal range as a result of determining whether or not the full stroke is within the normal range; and
   determining whether or not a selection operation is carried out at the position that is half of the full stroke after moving the finger to the position that is half of the previous full stroke,
   wherein an initial value of the previous full stroke is preset.

2. The method of claim 1, wherein when the selection operation has succeeded as a result of determining whether or not the selection operation is carried out in a selecting direction, it is determined that a process of setting the reference position of the actuator has succeeded.

3. The method of claim 2, further including:
   when the selection operation has failed as the result of determining whether or not the selection operation is carried out,
   moving the finger to an opposite end position in the both ends;
   moving the finger to the position that is half of the previous full stroke after moving the finger to the opposite end position has been carried out; and
   determining whether or not the selection operation has been carried out at the position that is half of the previous full stroke after moving the finger to the position that is half of the previous full stroke has been carried out.

4. The method of claim 3, wherein when the selection operation has succeeded as the result of determining whether or not the selection operation has been carried out, it is determined that the process of setting the reference position of the actuator has succeeded.

5. The method of claim 3, wherein when the selection operation has failed as the result of determining whether or not the selection operation has been carried out, it is determined that the process of setting the reference position of the actuator has failed.

* * * * *